Figure 4:
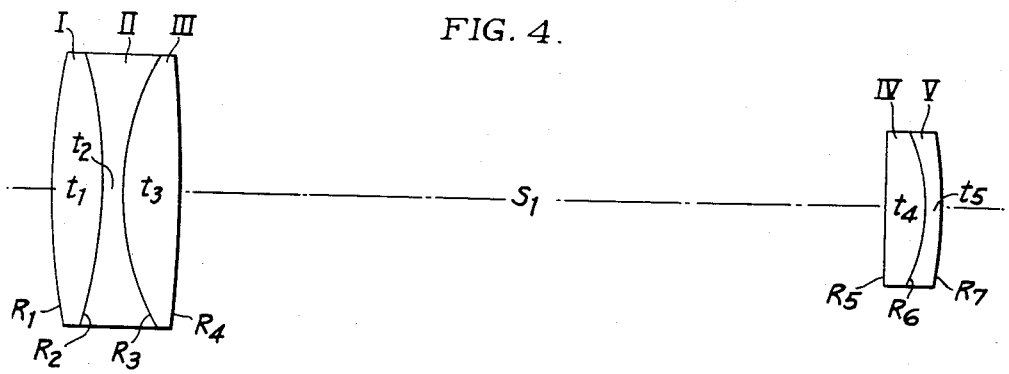

July 10, 1951  R. KINGSLAKE ET AL  2,559,881
OPTICAL SYSTEM COMPRISING A POSITIVE MEMBER
AND A WEAK AUXILIARY MEMBER
Filed Jan. 21, 1949   2 Sheets-Sheet 1

| EQUIVALENT FOCUS = 100mm. | | | | f/4.0 |
|---|---|---|---|---|
| LENS | N | V | RADII | THICKNESSES |
| I | 1.5170 | 64.5 | $R_1 = +47.28$ mm. | $t_1 = 6.02$ mm. |
| II | 1.6170 | 36.6 | $R_2 = -41.31$ | $t_2 = 2.62$ |
|  |  |  | $R_3 = -248.31$ | $S_1 = 65.62$ |
| III | 1.5013 | 56.5 | $R_4 = \infty$ | $t_3 = 4.59$ |
| IV | 1.6968 | 56.1 | $R_5 = -16.40$ | $t_4 = 2.62$ |
|  |  |  | $R_6 = -94.38$ |  |

FIG. 3A.

RUDOLF KINGSLAKE
HAROLD F. BENNETT
INVENTORS

BY
ATTORNEYS

July 10, 1951  R. KINGSLAKE ET AL  2,559,881
OPTICAL SYSTEM COMPRISING A POSITIVE MEMBER
AND A WEAK AUXILIARY MEMBER
Filed Jan. 21, 1949  2 Sheets-Sheet 2

RUDOLF KINGSLAKE
HAROLD F. BENNETT
INVENTORS

BY
ATTORNEYS

Patented July 10, 1951

2,559,881

UNITED STATES PATENT OFFICE 2,559,881

OPTICAL SYSTEM COMPRISING A POSITIVE MEMBER AND A WEAK AUXILIARY MEMBER

Rudolf Kingslake and Harold F. Bennett, Rochester, N. Y., assignors to Eastman Kodak Company, Rochester, N. Y., a corporation of New Jersey Application January 21, 1949, Serial No. 71,964

8 Claims. (Cl. 88—57)

This invention relates to optical systems comprising a positive member and a weak auxiliary member axially aligned therewith and spaced therebehind. The auxiliary member may be either positive or negative, or it may have zero power.

An object of the invention is to provide an objective which is shorter in over-all length than the conventional Petzval lens and which has better axial aberration corrections than the usual telephoto lens.

An object of a particular form of the invention is to provide a collimator system which is corrected for spherical aberration at two different image distances.

This invention is primarily concerned with the correction of spherical aberration and curvature of field, which are longitudinal aberrations (i. e. aberrations in the axial direction) as distinct from the lateral or transverse aberrations (coma and distortion), but it does not interfere with the usual correction of the latter aberrations.

Petzval objectives and telephoto objectives have heretofore been considered as distinct types. Both consist of a front positive member and a rear member spaced therefrom for modifying the pencils of rays coming from the front member; thus the rear member may be described as an auxiliary member. The two types have been considered as distinct because the auxiliary member is negative in telephoto objectives and positive in Petzval objectives. In known telephoto objectives the power of the auxiliary member varies from —0.5 to —3 or more times the power of the front member and has a strong negative glass-air surface which flattens the field.

In known Petzval objectives on the other hand, the power of the auxiliary component is greater than about half the power of the front component and up to perhaps 2 or 3 times as great. Thus there is a gap from about —0.5 to about +0.5 in this ratio of powers between the two known types. The present invention serves to fill this gap and with very beneficial results.

According to the present invention, an optical system includes a positive member and an auxiliary member axially aligned therewith and spaced therebehind by more than $0.3 F_1$ and less than $1.6 F_1$, where $F_1$ is the focal length and $1/F_1$ is the power of the positive member, in which the auxiliary member has a total thickness less than $0.3 F_1$, has at least two lens elements, has a power between $+1/F_1$ and $-1/F_1$ and preferably between $+0.5/F_1$ and $-0.5/F_1$, characterized in that the auxiliary member includes two adjacent lens elements differing in refractive index by more than 0.06 and less than 0.60, and differing in dispersive index by less than 20, the two adjacent surfaces of which differ in curvature by less than 30% and have a combined power between $-0.2/F_1$ and $-1.5/F_1$ and in that the sum of the powers of the remaining surfaces of said auxiliary member is between $+0.5$ and $-1.5$ times that of said two adjacent surfaces. The positive member should include or consist of one lens element of each sign. In a preferred form of the invention, the positive member consists of a single cemented component including a front biconvex element cemented to a negative element having a refractive index at least 0.05 greater than that of the front positive element.

As applied to the correction of the spherical aberration of a telescope objective when used at 1:1 conjugate, the auxiliary member may be placed behind the principal focal plane of the objective. Because of its position behind the focal plane, the auxiliary member does not disturb the correction of spherical aberration of the telescope objective when used as a collimator with a reticle at the principal focus. Alternatively, the auxiliary member may be placed at the focal plane or slightly in front thereof without having a great effect on that aberration. Preferably when used for this purpose, the auxiliary member is spaced from the telescope objective by at least $0.9F_1$ and by not more than $1.6F_1$, where $F_1$ is the focal length of the telescope objective. According to a preferred form of the invention, the auxiliary member consists of a low index positive element and a high index negative element, with a strong negative cemented surface between said elements which have their outer surfaces weakly curved or plane.

We have discovered that the field of the telescope objective is flattened by placing the auxiliary member between the telescope objective and its focal plane. The spacing between the auxiliary member and the telescope objective is not critical when the auxiliary member is used for this purpose, and can be between $0.3F_1$ and $0.9F_1$. In general, the auxiliary member has an effect on the spherical aberration and coma when it is placed in front of the focal plane, and this has to be corrected by modifying the curves of the telescope objective in a manner well known in the art. Also it may affect the focal length, but only moderately, as simple computations show that the focal length of the front component is between about 60% and 300% of the focal length of the objective as a whole when the power of the auxiliary component is within the stated range from $-1/F_1$ to $+1/F_1$, and is between about 75% and 150% thereof when said power is within the preferred range from $-0.5/F_1$ to $+0.5/F_1$.

Such an optical system may be described as a telephoto lens with very weak rear component or simply as a positive lens and a field-flattening component spaced therefrom. It has less zonal spherical aberration than telephoto lenses heretofore known, but it is shorter and therefore more convenient to use than the conventional Petzval lens, and thus fills the gap between the two known types.

In the simplest form of the invention, the auxiliary member consists of a positive element cemented to a negative element of higher refractive index. The difference in refractive index should be at least 0.06 and the power of the cemented surface should be at least one-fifth and preferably more than one-half that of the positive member in order to be effective for the purposes of the invention. The difference in refractive index can be as large as available glasses permit, which is about 0.60 for glasses known at the present time. The two elements are not necessarily cemented together however, and in some circumstances it may be preferred to have them slightly air-spaced. If such is the case, it is preferred that the radii of curvature of the two adjacent surfaces should not differ by more than 30 per cent of the shorter radius and that the two elements be spaced apart by less than $1/20$ the focal length of the positive member. Obviously, additional lens elements may be used, for example for the purpose of correcting the chromatic aberration.

One of the advantages of the invention is that it makes it possible to flatten the field of a telephoto lens in which the power of the second member is substantially zero. Telephoto objectives have been known heretofore in which the power of the second component is almost as small as one-half that of the front component, and in these known objectives the second component flattens the field by having a strong negative glass-air surface. In lenses according to the simplest form of the invention, however, the field is flattened by a negative cemented surface, which has the strong curvature necessary to flatten the field without having too much negative power. The power on the other surfaces of the auxiliary member may vary over quite a large range without destroying this field-flattening feature. For the special purposes for which the first examples hereinafter tabulated were computed, the power of the auxiliary member is preferably between $+0.5$ and $-0.5$ times the power of the positive member, however it could have a power as great as $+1.0$ or $+1.5$ times that of the positive member and the effect of the strong negative surface would be such as to provide a great improvement in the curvature of field as compared with ordinary Petzval lenses, if not to flatten it completely.

For practical reasons, the radii of curvature of the pair of interior surfaces should be greater than $0.1F_1$, and an upper limit of approximately $3F_1$ is directly derived from the limitations on power and refractive index already described. In fact, this lower limit applies to all surfaces in the objective.

Objectives according to the invention are very useful as telescope objective systems and, when used as such, it is preferred that the auxiliary member should not have negative power numerically greater than one-half the power of the positive member. Attempts have been made to use stronger telephoto lenses than this as telescope objectives, but the zonal spherical aberration has been found to be too great for satisfactory results under usual conditions. The field of a telescope objective has sometimes been flattened by a strong negative component next to the focal plane. This arrangement is well known but has the disadvantage of bending the principal rays away from the axis and thus making necessary the use of a large diameter eyepiece. In systems according to the present invention, however, the field is flattened with little or none of this undesirable bending of the principal rays away from the axis.

In the accompanying drawing:

Figure 1 shows an optical system in which the auxiliary member is beyond the principal focus of the positive member; and Figures 2, 3, 4 and 5 show optical systems in which the auxiliary member is between the positive member and its focal plane. Figure 3A is a table of the constructional data for the example of Figure 3.

In Figure 1 a telescope objective 1 focuses sharply on the reticle 2 but if used alone at finite conjugates to focus on a second reticle 4, the spherical aberration is under-corrected. The auxiliary component 3 is placed behind the reticle 2 so that it has no effect on the beam focusing thereon, but it has a strong negative cemented surface R7 which corrects the spherical aberration of the beam focusing on reticle 4. The rear surface R8 of the auxiliary component is flat and the front surface R6 is convex and nearly balances out the power of the cemented surface.

Figures 2 and 3 show weak telephoto objectives in which the positive member 1 consists of a cemented doublet and the auxiliary member 2 is a very weak negative cemented doublet. In Figure 2, the correcting surface R5 is convex to the front, and in Figure 3 it is concave thereto.

Figure 4 is very similar to Figure 3 except that the positive member consists of a cemented triplet in which the glass is selected so as to reduce the secondary spectrum.

Figure 5:
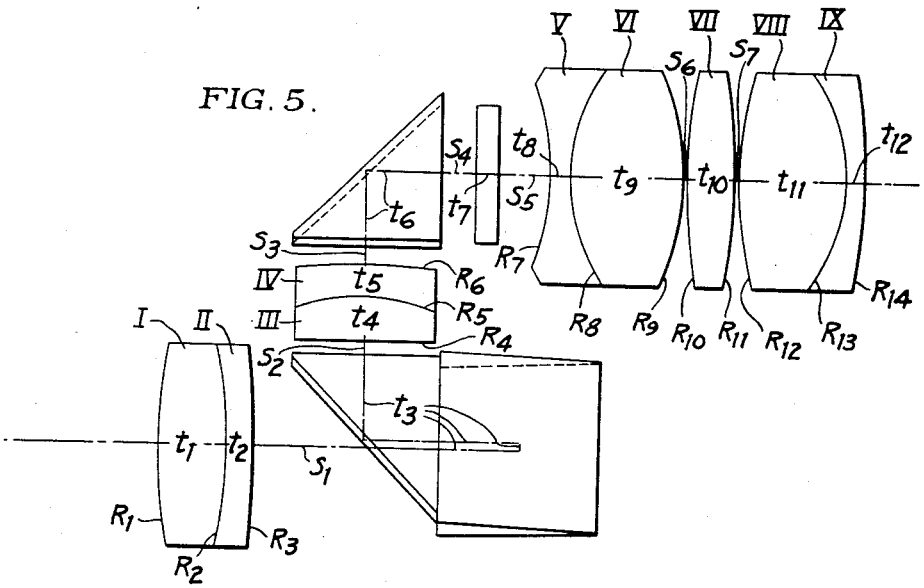

Figure 5 shows an objective according to the invention incorporated in a prismatic telescope system. The erecting prisms are the usual types of Porro prism except for the minor change that, for convenience in mounting, the second Porro prism is divided and the auxiliary component of the objective system is mounted between its two parts. If preferred, this component may be cemented to one of the parts of the prism; in the example, this would be the front part of the second Porro prism. It will be obvious to all skilled in lens designing that decreasing the space $S_2$ has no optical effect if the front space $S_1$ is correspondingly increased. In the drawing the prisms and the auxiliary component are shown slightly rotated out of their normal position with respect to each other so that the prisms can be shown in perspective and the lens component in axial section. Any standard type of eyepiece can be used, the one shown being of the general type described in U. S. Patent 2,423,676 Altman issued July 8, 1947.

The following tables give constructional data for the examples shown in the drawings:

Example 1, Fig. 1

| Lens | N | V | Radii | Thicknesses |
|---|---|---|---|---|
| I | 1.5411 | 59.9 | $R_1=+ 56.72$ mm. | $t_1= 4.00$ mm. |
| II | 1.6210 | 36.2 | $R_2=- 37.11$ | $t_2= 2.14$ |
|  |  |  | $R_3=-187.86$ | $s_1=90.84$ |
| III | 1.5838 | 46.0 | $R_4=\infty$ | $t_3= 1.89$ |
|  |  |  | $R_5=\infty$ | $s_2= 7.06$ |
| IV | 1.5230 | 58.6 | $R_6=+ 46.73$ | $t_4= 9.99$ |
| V | 1.7445 | 45.8 | $R_7=- 16.43$ | $t_5= 2.85$ |
|  |  |  | $R_8=\infty$ |  |

Example 2, Fig. 2

| Lens | N | V | Radii | Thicknesses |
|---|---|---|---|---|
| I | 1.5170 | 64.5 | $R_1=+ 47.85$ mm. | $t_1= 6.02$ mm. |
| II | 1.6170 | 36.6 | $R_2=- 40.87$ | $t_2= 2.62$ |
|  |  |  | $R_3=-232.96$ | $s_1=65.60$ |
| III | 1.6110 | 58.8 | $R_4=+131.22$ | $t_3= 1.97$ |
| IV | 1.523 | 58.6 | $R_5=+ 16.40$ | $t_4= 5.25$ |
|  |  |  | $R_6=+102.29$ |  |

Example 3, Fig. 3

| Lens | N | V | Radii | Thicknesses |
|---|---|---|---|---|
| I | 1.5170 | 64.5 | $R_1=+ 47.28$ mm. | $t_1= 6.02$ mm. |
| II | 1.6170 | 36.6 | $R_2=- 41.31$ | $t_2= 2.62$ |
|  |  |  | $R_3=-248.31$ | $s_1=65.62$ |
| III | 1.5013 | 56.5 | $R_4=\infty$ | $t_3= 4.59$ |
| IV | 1.6968 | 56.1 | $R_5=- 16.40$ | $t_4= 2.62$ |
|  |  |  | $R_6=- 94.38$ |  |

Example 4, Fig. 4

| Lens | N | V | Radii | Thicknesses |
|---|---|---|---|---|
| I | 1.5254 | 54.8 | $R_1=+ 52.90$ mm. | $t_1= 4.78$ mm. |
| II | 1.6129 | 44.0 | $R_2=- 40.93$ | $t_2= 1.77$ |
| III | 1.6170 | 55.0 | $R_3=+ 24.82$ | $t_3= 5.15$ |
|  |  |  | $R_4=-234.86$ | $s_1=68.12$ |
| IV | 1.5286 | 51.6 | $R_5=\infty$ | $t_4= 3.43$ |
| V | 1.6968 | 56.1 | $R_6=- 17.23$ | $t_5= 1.37$ |
|  |  |  | $R_7=- 91.40$ |  |

Example 5, Fig. 5

| Lens | N | V | Radii | Thicknesses |
|---|---|---|---|---|
| I | 1.511 | 63.5 | $R_1=+52.08$ mm. | $t_1=6.03$ mm. |
| II | 1.617 | 36.6 | $R_2=-40.45$ | $t_2=2.63$ |
|  |  |  | $R_3=-159.66$ | $s_1+s_2=26.06$ |
| Prism | 1.517 | 64.5 |  | $t_3=60.26$ |
| III | 1.5725 | 56.8 | $R_4=\infty$ | $t_4=4.61$ |
| IV | 1.6968 | 56.1 | $R_5=-16.025$ | $t_5=2.63$ |
|  |  |  | $R_6=-226.45$ | $s_3+s^4=4.45$ |
| Prism | 1.517 | 64.5 |  | $t_6=18.55$ |
| Plate | 1.523 | 58.6 |  | $t_7=2.20$ |
|  |  |  |  | $s_5=4.52$ |
| V | 1.649 | 33.8 | $R_7=-24.14$ | $t_8=1.98$ |
| VI | 1.6109 | 57.2 | $R_8=+17.61$ | $t_9=10.56$ |
|  |  |  | $R_9=-24.25$ | $s_6=0.11$ |
| VII | 1.6109 | 57.2 | $R_{10}=+58.17$ | $t_{10}=4.62$ |
|  |  |  | $R_{11}=-58.17$ | $s_7=0.11$ |
| VIII | 1.6968 | 56.1 | $R_{12}=+35.20$ | $t_{11}=9.90$ |
| IX | 1.7200 | 29.3 | $R_{13}=-15.84$ | $t_{12}=1.76$ |
|  |  |  | $R_{14}=-54.89$ |  |

In these tables the lens elements are numbered by Roman numerals from front to rear. The second and third columns give the refractive index N for the D line of the spectrum and the reciprocal dispersive index V. The last two columns give the radii R, thicknesses t, and airspaces s, each numbered by subscript from front to rear. The values of R are given as positive or negative according to whether the surfaces are convex or concave to the front. In Example 1, the focal length of the component I is 100 mm. In the other examples the focal length of the objective system as a whole is 100 mm.

The following table gives in similar form the constructional data for another objective system for telescopes. It was designed for an elbow telescope, so that there is but a single prism, which lies between the components of the objective system. In this example the auxiliary component has positive power.

Example 6

| Lens | N | V | Radii | Thicknesses |
|---|---|---|---|---|
| I | 1.517 | 64.5 | $R_1=+ 60.98$ mm. | $t_1= 1.47$ mm. |
| II | 1.649 | 33.8 | $R_2=- 42.34$ | $t_2= 1.04$ |
|  |  |  | $R_3=-139.26$ | $s_1+s_2=57.25$ |
| Prism | 1.517 | 64.5 |  | $t_3=33.72$ |
| III | 1.498 | 67.0 | $R_4=\infty$ | $t_4= 1.04$ |
| IV | 1.697 | 56.1 | $R_5=- 16.31$ | $t_5= 0.52$ |
|  |  |  | $R_6=- 56.19$ | BF=21.41 |

The following table gives some additional data regarding these examples:

| Example | $F_1$ | $S_1/F_1$ | $P_2/P_1$ | $P_c/P_1$ | $P_d/P_a$ |
|---|---|---|---|---|---|
| 1 | 100 mm. | .99 | −.13 | −1.35 | −.83 |
| 2 | 91.2 | .72 | −.53 | −.49 | +.09 |
| 3 | 91.2 | .72 | −.40 | −1.09 | −.62 |
| 4 | 95.5 | .71 | −.20 | −.93 | −.78 |
| 5 | 91.1 | .72 | −.42 | −.71 | −.40 |
| 6 | 100.1 | .79 | +.02 | −1.07 | −1.02 |

In the table $S_1$ is the space between the two members given as an equivalent air space. $F_1$ is the focal length and $P_1$ the power of the positive member; $P_2$ is the power of the auxiliary member; $P_c$ is the power of the cemented surface of the auxiliary member; $P_d$ is the sum of the powers of the other surfaces of the auxiliary member. It is evident from the above tables that each example shown embodies the important features of the invention.

This invention is similar to that shown in an application, Ser. No. 71,965, filed concurrently herewith by one of us and makes use of some of the same optical principles.

We claim:

1. An optical objective comprising a positive member and a weak auxiliary member axially aligned therewith and spaced therebehind by more than $0.3F_1$ and less than $1.6F_1$, where $F_1$ is the focal length and $1/F_1$ the power of the positive member, in which $F_1$ is between 0.6 and 3.0 times the focal length of the objective as a whole, in which each member consists of a plurality of lens elements including at least one of each sign, in which the positive member has an undercorrected residual of a longitudinal aberration for at least one object distance at which the objective is used, in which the auxiliary member is between the positive member and the image plane corresponding to said object distance, and in which the auxiliary member has a total thickness less than $0.3F_1$, has at least two lens elements, and has a power between $+1/F_1$ and $-1/F_1$, characterized in that the auxiliary member includes two adjacent lens elements differing in refractive index by more than 0.06 and less than 0.60 and differing in dispersive index by less than 20, the two adjacent surfaces of which differ in curvature by less than 30% and have a combined power between $-0.2/F_1$ and $-1.5/F_1$ and in that the sum of the powers of the other surfaces of said auxiliary member is between $+0.5$ and $-1.5$ times that of said two adjacent surfaces, whereby the auxiliary member contributes to the said aberration in a sense opposite to that of the positive member when used at said object distance.

2. An optical system according to claim 1 in which the positive member includes a positive component which comprises a biconvex element cemented to the front of a negative element whose refractive index is higher than that of the biconvex element by at least 0.05.

3. An optical system according to claim 1 in which the said two adjacent surfaces in the auxiliary member have the same curvature and are cemented together.

4. An optical system according to claim 3 in which the auxiliary member consists entirely of said two lens elements.

5. An optical objective system comprising a positive member and a weak auxiliary member axially aligned therewith and spaced therebehind by more than $0.3F_1$ and less than $0.9F_1$, where $F_1$ is the focal length and $1/F_1$ the power of the positive member, in which $F_1$ is between 0.6 and 3.0 times the focal length of the objective as a whole, in which the positive member has an undercorrected residual of curvature of field, and in which each member comprises at least one lens element of each sign and the auxiliary member has a thickness less than $0.3F_1$ and a power between $+1/F_1$ and $-1/F_1$, characterized in that the auxiliary member includes two adjacent lens elements differing in refractive index by more than 0.06 and less than 0.60 and differing in dispersive index by less than 20, the two adjacent surfaces of which differ in curvature by less than 30% and have a combined power between $-0.2/F_1$ and $-1.5/F_1$ and in that the sum of the powers of the other surfaces of said auxiliary member is between $+0.5$ and $-1.5$ times that of said two adjacent surfaces, whereby the auxiliary member contributes to the curvature of field in a sense opposite to that of the positive member.

6. An objective system according to claim 5 in which the power of the auxiliary member is between $+0.5/F_1$ and $-0.5/F_1$, and $F_1$ is between 0.75 and 1.5 times the focal length of the objective system as a whole.

7. An objective system according to claim 5 in which the positive member consists of a positive component which comprises a biconvex element cemented to the front of a negative element whose refractive index is higher than that of the biconvex element by between 0.05 and 0.60.

8. An objective system according to claim 7 in which the auxiliary member consists of two lens elements only, and has a power between $+0.5/F_1$ and $-0.5/F_1$, and $F_1$ is between 0.75 and 1.5 times the focal length of the objective system as a whole.

RUDOLF KINGSLAKE.
HAROLD F. BENNETT.

REFERENCES CITED

The following references are of record in the file of this patent:

UNITED STATES PATENTS

| Number | Name | Date |
|---|---|---|
| 1,073,950 | Bielicke | Sept. 23, 1913 |
| 1,479,251 | Repp | Jan. 1, 1924 |
| 1,484,853 | Warmisham | Feb. 26, 1924 |
| 1,610,514 | Graff | Dec. 14, 1926 |
| 1,843,519 | Richter | Feb. 2, 1932 |
| 2,321,973 | Bennett | June 15, 1943 |